Oct. 7, 1930.  J. B. ANDERSON  1,777,279
WING FOR AIRCRAFT
Filed July 3, 1929
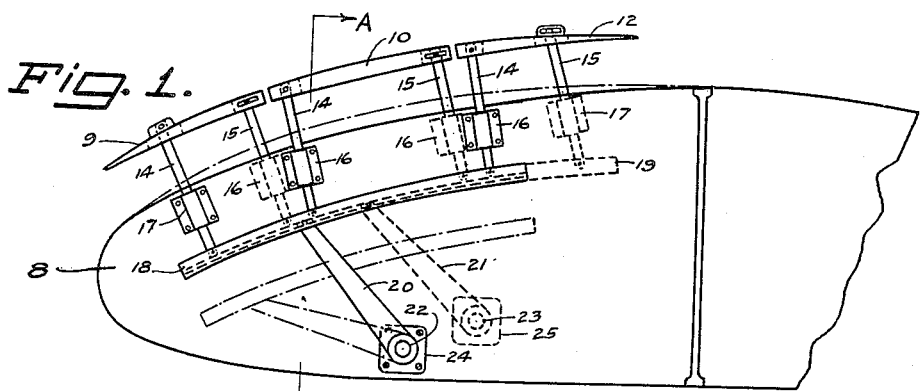
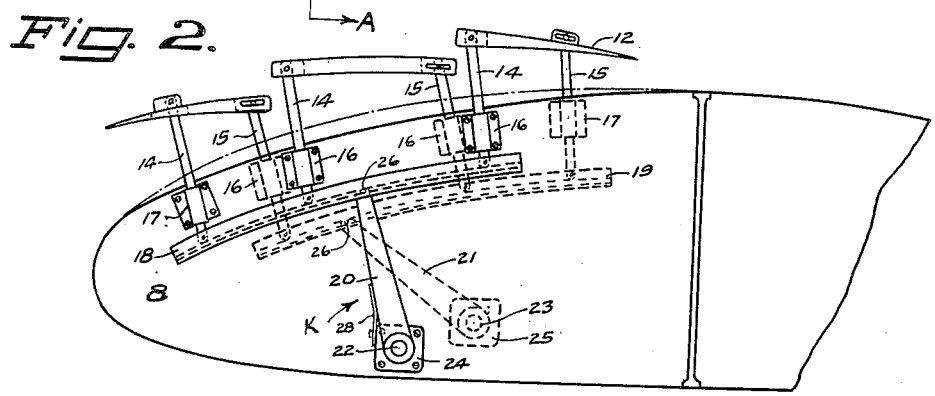
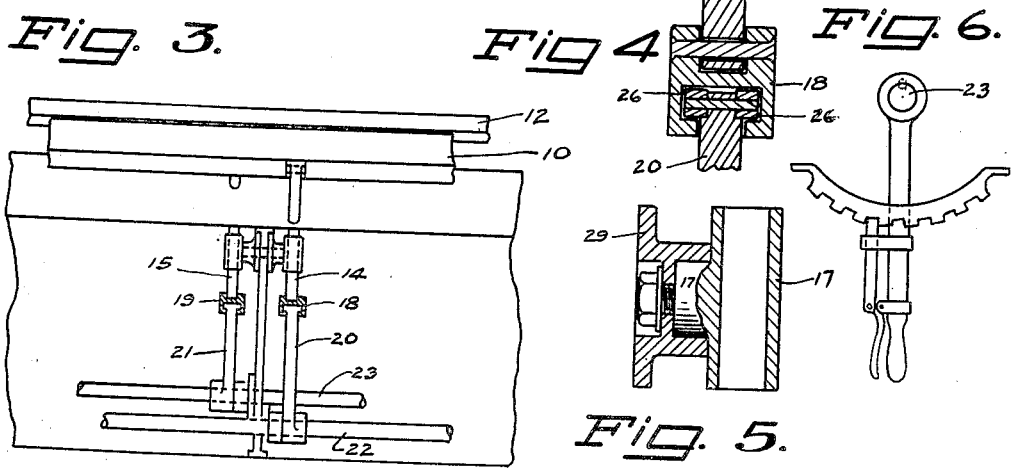
INVENTOR.
JAMES BRUSH ANDERSON
BY
*George F. Bailey*
ATTORNEYS.

UNITED STATES PATENT OFFICE

JAMES BRUSH ANDERSON, OF OAKLAND, CALIFORNIA, ASSIGNOR OF ONE-FOURTH TO JOSEPH J. GOMES, OF OAKLAND, CALIFORNIA

WING FOR AIRCRAFT

Application filed July 3, 1929. Serial No. 375,736.

This invention relates to the providing of improved adjustable means on the leading edge of the wing for the purpose of directing the air current in a manner that will increase or decrease the lift of the wing, and also, for the purpose of breaking ice that often forms on the leading edge of the wing.

It is well known that ice forming on the leading edge of an airplane wing will cause the plane to lose speed and finally stall the plane if it is not removed. It is evident that ice forming on a wing in quantities will cause the air flow over the camber or top part of the wing to flow different than normal, and will thereby give more drag, and will thus decrease the lifting power that is required to sustain the airplane while in flight.

It is an object of the invention to improve the method of directing the air flow over the camber and top part of the wing and to eliminate ice forming on the forward portion thereof by providing a plurality of oblong members, hereinafter called slats, and to mount the said slats adjustable on the front portion of the wing in such a manner that they may be moved and adjusted as desired from the cabin of the plane. The said slats are so shaped that when they are in their normal position, they will form the forward portion of most any standard or known type of wing now in use. By forcing the said slats outwardly by any suitable means, either by hand or other power from the cabin, they will break the ice that may have accumulated on the leading edge of the wing, and at the same time the said slats may be adjusted to direct the air flow downward so as to help the lift of the main wing, the said adjustment also causing a lifting force to be applied against each one of the slats.

The nearer one can direct the air flow over the surface of the top of the camber of the wing surface, the better the effect will be, for it decreases the eddy that forms which causes a drag that decreases the lift. The increased lift of the wing by slats directing the air current close to the surface of the wing, will of course depend on what drag it reduces and what is added in lift by the slats as they act as auxiliary wings lifting also when they are adjusted in the proper position relative to the main wing.

A movable wing has given something very advantageous to an airplane, and the said slats can be so arranged and adjusted to accomplish as much as the movable wing and still leave the wing in its normal position, thereby saving considerable expense in construction work in large and heavy loaded planes and also saving considerable weight, and at the same time provides a safety device that will increase the control of the plane. A plurality of slats properly designed will act as a small auxiliary wing to the main wing and can be adjusted into many different positions which will equal a movable wing device, for the said slats can be adjusted to increase the lift or decrease the lift in a moment's time, and all of the said adjustments may be made from the cabin of the plane while flying.

The providing of a plurality of slats, as illustrated in the present invention, possesses many distinct advantages. For example, several slats which can be raised and adjusted, make it possible to accomplish many things that a one slotted wing, provided on the leading edge of the main wing that is adjustable only to one position, can not do. In other words, the providing of a plurality of slats that may be adjusted to different heights and positions, will increase the range of control in different kinds of flying and will thereby increase the usefulness of a plane for war purposes and commercial purposes, as well as for stunt flying.

The invention possesses various objects and features of advantage, some of which, with the foregoing, will be made manifest in the following description of the preferred form of the invention that is illustrated in the drawings accompanying and forming part of the specification.

It is to be understood that it is not intended to limit the invention to the embodiment shown by said drawings and descriptions, as variations may be adapted within the scope of the invention as set forth in the claims.

In the accompanying drawings:

Figure 1 is a transverse sectional view taken through the forward portion of one type of airplane wing, with a preferred form of the invention mounted thereon, and showing the slats raised to a certain position.

Figure 2 is a transverse sectional view similar to Figure 1 except showing the slats adjusted to different positions.

Figure 3 is a sectional view taken through line A—A of Figure 1, looking in direction of the arrows.

Figure 4 is an end sectional view of an arc-shaped member used to raise and adjust the position of the slats.

Figure 5 is a sectional view of one of the bearings used in the invention.

Figure 6 is a view illustrating one form of mechanism that may be used to control the adjusting of the slats.

Referring in detail to the different parts wherein like reference characters denote corresponding parts throughout the several views, the numeral 8 designates the leading edge of one type of airplane wing and numerals 9, 10 and 12 designate a plurality of slats that are mounted adjustable thereon. These slats may have any suitable length, width and thickness and may be shaped in any suitable form and constructed out of any suitable material. The preferred form, however, is illustrated in Figures 1 and 2, and consists in shaping the bottom face of the said slats to conform with the top face of the leading edge of the wing upon which they rest. The top faces of the slats are slightly curved and the end slats are tapered so as to provide a smooth uninterrupted surface on the wing when the slats are in their lowermost position and rest thereon.

Each slat is provided with a plurality of vertical shafts 14 and 15 that are hinged to the slats in any suitable manner to permit the vertical angle thereof to be adjusted. Each shaft is supported slidable in a bearing that is fastened to the cross rib of the wing, and it will be noted that some of the said bearings run at an angle with respect to each other. This is provided for the purpose of causing the slats to move apart when they are raised and to move together when they are lowered. The object of having the slats move apart when they are raised is to provide clearance between the ends thereof so that they may be swung vertically without interference, and the object of having them move together when they are lowered is to have the ends thereof fit tightly together when the slats are in their lower position and are resting on the top surface of the wing. In Figure 1, it will be seen that the vertical shafts that are hinged to the central slat 10 are in parallel with each other and that the shafts that are hinged to the slats 9 and 12 run at an angle with respect to the said shafts that are hinged to the slat 10, which will cause the end slats to move away from the central slat when they are raised. It will also be noted that the shafts 14 are each hinged in a fixed position to their respective slats and that the shafts 15 are each mounted slidable and pivotable to their respective slats so that the said slats will be freely movable with respect to the shafts on one end when they are vertically adjusted. The bearings 16 are standard plain bearings and the bearings 17 are constructed with a swivel joint as shown in Figure 5 to prevent excessive friction when the shafts are moved therein.

Any suitable means may be used to raise and lower and adjust the slats, the method illustrated in the accompanying drawings consisting in the providing of a plurality of arc-shaped members 18 and 19 having a bottom channel shaped guideway as shown in Figure 4. Arms 20 and 21 are provided and respectively fixed on revolvable shafts 22 and 23 that are mounted in suitable bearings 24 and 25 that are fastened to the wing. A roller 26 is revolubly mounted on the outer end of each of the said arms and in the bottom guideway of their respective arc members, and the lower end of each of the shafts 14 and 15 is pivoted to their respective arc members as shown in Figure 4. It will be noted that the shafts 14 that are hinged to the front portion of each slat are all pivoted to the arc members 18 and that the shafts 15 that are hinged to the rear portion of each slat are pivoted to the arc member 19. It is to be understood that these arc members may be arranged in series across the entire length of the wing. It is also to be understood that the shafts 22 and 23 extend past the cabin and may be operated therefrom. Figure 6 designates a standard ratchet that is fixed to the shafts 22 and 23, which may be operated from the cabin, and is shown merely to illustrate one method for adjusting the slats.

From the foregoing it will be observed that when the shaft 23 is turned in the direction of the arrow K, the arm 21 that is fixed thereon will move upwardly and cause the arc member 19 to rise, which will raise the slats through the vertical shafts 14. A spring 28 is fastened to the bearing 24 and is applied against the arm 20 to produce pressure against the said arm in the direction of the arrow K so that when the said arm 20 is unlocked and the arm 21 is unlocked and moved upwardly, the spring will force the arm 20 upwardly in synchronism with the arm 21. This operation is made when it is desired to raise the slats. In other words, both shafts 22 and 23 are turned simultaneously when it is desired to raise the slats. When it is desired to adjust the vertical angle of the slats, the shaft 22 is kept in its locked position and the shaft 23 is turned to the position desired. The construction shown in Figure 6 is provided on each shaft 22 and 23 and illustrates one method that may be used to hold the shafts in locked position.

While the invention is very simple, it serves many advantageous purposes. It provides a practical means for quickly clearing the front edge of the wing of ice. The slats may be so adjusted while flying that they can be used to deflect the wind in many directions. The adjusting of said slats may be used to increase or decrease the lift of the wing. They may also be used to keep the plane from stalling and spinning when the aviator finds he is climbing at too steep an angle or if the motor should not function properly. The adjustment will help to take a plane out of a nose dive or spin more quickly, thereby increasing the safety of the plane. It will allow the plane to land in a small field and will also allow the plane to take a longer glide than normal should the motor go dead. As the said air deflecting members may be used as auxiliary wings to the main wing, a proper take-off from the ground or water may be made with a much heavier load as each slat or air deflecting member will help to lift and at the same time will direct the air flow over the top of the wing as desired.

Having thus illustrated and described a certain form of construction and arrangement of parts pertaining to the invention, it is to be understood that the improvements may be embodied on any type of wing structure used for aircraft which, obviously, may be built up in any suitable manner, and it is also to be understood that the air deflecting members called slats may have any suitable shape and may be provided in any suitable number, the present illustration not indicating the only arrangement or form of construction into which the parts may be made; and it is desired to include in this Letters Patent of the United States of America any and all patentable novelty that exists in the invention disclosed and all that comes within the range of the invention as set forth in the claims hereinafter mentioned.

What is claimed:

1. A wing structure for aircraft provided with a plurality of slats that are mounted vertically and horizontally adjustable thereon and arranged transversely to the direction of flight, with their front and rear sides adjacent each other; means for raising the said slats above the wing; and means whereby when the slats are raised their adjacent sides will move apart so that the angle of the slats can be adjusted vertically and when the said slats are lowered they will move with their sides coming close together to form an uninterrupted surface over the wing.

2. A wing structure for aircraft having in combination with the wing, a plurality of oblong members that are arranged transversely to the direction of flight, on the upper forward portion thereof, and are mounted vertically and horizontally adjustable thereon; said oblong members being arranged in series, on the upper forward portion of the wing, with their sides close together and the under surface thereof being constructed to conform to the shape of the wing; the top surface of the front and rear oblong members being tapered to form an uninterrupted surface with the wing when they are in their lower position thereon; means for raising the oblong members with respect to the wing; means for adjusting the vertical angle of the oblong members; and means to cause the oblong members to move apart with respect to each other when they are raised so that the angle of each oblong member may be vertically adjusted.

3. An air controlling device, for use in combination with a wing structure for aircraft, comprising a plurality of air deflecting members mounted adjustable on the upper forward portion of the wing and arranged transversely to the direction of flight thereon; a plurality of shafts, having slidable support on the wing structure, hinged to one portion of the air deflecting members; a plurality of other shafts, supported slidable on the wing structure, hinged to another portion of the air deflecting members and mounted slidable thereon; means for raising and lowering the said shafts to adjust the said air deflecting members; and means for locking the parts to the wing.

In testimony whereof, I hereunto affix my signature.

JAMES BRUSH ANDERSON.